P. A. La FRANCE.

Assignor to himself and H. R. Kendall.

CIGAR CUTTER.

No. 7,318. Reissued Sept. 26, 1876.

*Witnesses:*

H. A. Chum

G. W. Baldwin

*Inventor:*

P. A. La France

N. PETERS, PHOTO-LITHOGRAPHER, WASHINGTON, D. C.

UNITED STATES PATENT OFFICE.

PETER A. LA FRANCE, OF ELMIRA, NEW YORK, ASSIGNOR TO HIMSELF AND HENRY R. KENDALL.

IMPROVEMENT IN CIGAR-CUTTERS.

Specification forming part of Letters Patent No. 86,764, dated February 9, 1869; reissue No. 7,318, dated September 26, 1876; application filed January 17, 1876.

*To all whom it may concern:*

Be it known that I, P. A. LA FRANCE, of Elmira, in the county of Chemung and State of New York, have invented a new and Improved Device for Trimming Cigar-Ends; and I do hereby declare that the following is a clear, full, and exact description thereof, which will enable others skilled in the art to make and use the same, reference being had to the accompanying drawings, forming part of this specification, in which—

Figure 1:
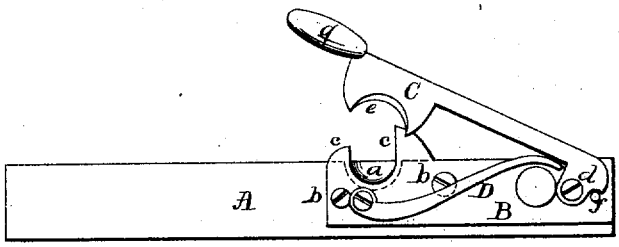
Figure 2:
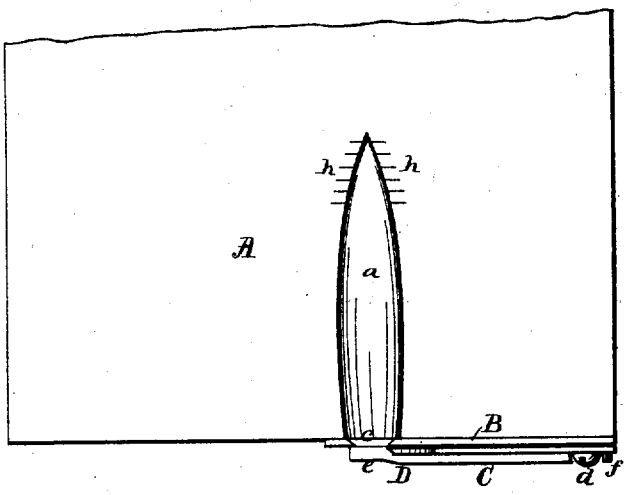

Figure 1 represents a side view of my improved cigar-trimmer. Fig. 2 is a plan or top view of the same.

Similar letters of reference indicate corresponding parts.

This invention relates to a new machine for trimming the ends of cigars, and especially the thick ends, which, for cigar-makers' use, it is of great importance to have nicely executed, as thereby also the length of the cigar is regulated.

The invention consists of a grooved bed, on which the cigar is supported, and of two cutters operating like shears, one of them being secured to the edge of the bed, while the other is pivoted to be swung up and down at will. A spring keeps the knives apart, so that the machine is always ready for action.

A, in the drawing, represents a wooden or other bed or board, made of suitable size, and provided on its face with a groove, *a*, which is sufficiently large to receive a cigar.

To one end of the bed is fastened, by means of screws *b b*, or otherwise, a fixed knife, B, which has a concave cutting-edge, *c*, and which is so placed that the cutting-edge is opposite the large end of the groove A, so that a cigar can be placed in the groove with its thick end upon the edge *c*.

C is a knife, pivoted by means of a pin, *d*, to the edge of A, and provided with a cutting-edge, *e*, as shown in Fig. 1. When the knife C is swung down its cutting-edge will come opposite to that of the cutter B, and the two knives will sever the end of the cigar projecting beyond the bed.

A spring, D, serves to hold the knife C up as long as it is not used, and a pin, *f*, arrests the knife so that it cannot be thrown up too far by the said spring. *g* is the handle of the knife C.

Near the groove *a* may, on the bed A, be marked a scale or index, as at *h* in Fig. 2. The object of this would be to indicate the length of the cigar, so that when a large number has to be trimmed they may all be made of equal lengths.

When the cutters B and C are moved to come in contact with the cigar their cutting-surface encircles it and cuts from the outer circle of the cigar to its center without flattening it, or otherwise leaving it unfinished.

Having thus described my invention, I claim as new and desire to secure by Letters Patent—

In combination, a table adapted to receive and retain the cigar in proper position, and a concave knife, B, attached to the table, so that the large end of the cigar will lie in the concavity, and a concave cutter, C, actuated by a lever, to close upon the end of the cigar with a circular or oval cutting-orifice, substantially as set forth.

P. A. LA FRANCE.

Witnesses:
GEO. L. DAVIS,
C. A. REED.